United States Patent
Berglund et al.

(10) Patent No.: US 6,287,480 B1
(45) Date of Patent: *Sep. 11, 2001

(54) DEICING COMPOSITIONS AND METHODS OF USE

(75) Inventors: Kris A. Berglund, Okemos; Hasan Alizadeh, East Lansing; Dilum D. Dunuwila, Okemos, all of MI (US)

(73) Assignees: Applied CarboChemicals, Inc., Alto; Michigan State University, East Lansing, both of MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,401

(22) Filed: Jan. 11, 2000

(51) Int. Cl.$^7$ .................................................... C09K 3/18
(52) U.S. Cl. ................................. 252/70; 106/13
(58) Field of Search ................................. 106/13; 252/70

(56) References Cited

U.S. PATENT DOCUMENTS

| | | | | |
|---|---|---|---|---|
| 4,448,702 | * | 5/1984 | Kaes ........................................ | 252/70 |
| 5,770,435 | * | 6/1998 | Donnelly et al. ................ | 435/252.33 |
| 5,876,621 | * | 3/1999 | Sapienza .................................. | 252/70 |
| 5,942,150 | * | 8/1999 | Heuer et al. ............................ | 252/70 |
| 5,958,744 | * | 9/1999 | Berglund et al. ..................... | 435/145 |

FOREIGN PATENT DOCUMENTS 77 767 * 4/1983 (EP).

* cited by examiner

*Primary Examiner*—Anthony Green
(74) *Attorney, Agent, or Firm*—Stroock & Stroock & Lavan LLP

(57) ABSTRACT

Improved deicing compositions and methods are provided. In particular, the subject invention is directed at deicing compositions which are suitable and effective for airport applications in which corrosion of magnesium based alloys is an issue. In particular, the invention is directed at deicing compositions which are less corrosive of steel and aluminum and certain magnesium based parts than conventional road salt. For example, the invention is directed to deicing compositions which are substantially less corrosive than allowed for use on aircraft metal parts, such as magnesium based alloys unlike acetate and formate salts. The subject invention is also directed at deicing compositions which inhibit the corrosive effects of conventional road salt. The subject invention is also directed at deicing compositions comprising effective deicing amounts of succinate salts, such as potassium succinate (trihydrate), ammonium succinate (anhydrous), sodium succinate (hexahydrate), either alone or in combination. The subject invention is also directed at deicing compositions comprising effective corrosion inhibiting, deicing amounts of potassium succinate together with effective amounts of 1) polymaleimide sodium salt and magnesium succinate, 2) magnesium succinate and sodium polyaspartate, 3) sodium polysuccinimide, 4) sodium polyaspartate and polymaleimide sodium salt, 5) magnesium succinate or 6) sodium chloride which will enhance deicing and/or corrosion inhibiting properties.

21 Claims, 10 Drawing Sheets a = POTASSIUM SUCCINATE:SODIUM CHLORIDE = 2:98
b = CMA:SODIUM CHLORIDE = 2:98
c = SODIUM CHLORIDE a = POTASSIUM SUCCINATE
b = SODIUM SUCCINATE
c = AMMONIUM SUCCINATE
d = SODIUM CHLORIDE a = POTASSIUM SUCCINATE
b = SODIUM SUCCINATE
c = AMMONIUM SUCCINATE
d = SODIUM CHLORIDE a = POTASSIUM SUCCINATE:SODIUM CHLORIDE = 2:98
b = SODIUM SUCCINATE:SODIUM CHLORIDE = 2:98
c = AMMONIUM SUCCINATE:SODIUM CHLORIDE = 2:98
d = SODIUM CHLORIDE a = SODIUM CHLORIDE
b = POLYMALEIMIDE SODIUM SALT (PH):SODIUM CHLORIDE = 2:98
c = POLYMALEIMIDE SODIUM SALT (PH):SODIUM CHLORIDE = 5:95
d = POLYMALEIMIDE SODIUM SALT (FH7):SODIUM CHLORIDE = 2:98
e = POLYMALEIMIDE SODIUM SALT (FH13):SODIUM CHLORIDE = 2:98
PH = PARTIALLY HYDROLYZED
FH7 = FULLY HYDROLYZED AND FREEZE DRIED AT pH=7
FH13 = FULLY HYDROLYZED AND FREEZE DRIED AT pH=13 a = UNDILUTED CF7
b = CF7
c = POTASSIUM FORMATE
d = POTASSIUM ACCETATE
e = MPDC (THE MIXTURE CLAIMED IN [5])
f = POTASSIUM SUCCINATE a = POTASSIUM SUCCINATE
b = NaPsimd:POTASSIUM SUCCINATE = 1:99
NaPsimd = POLYMALEIMIDE SODIUM SALT a = KS
b = KS:MgS = 95:5
c = KS:MgS:NaPasp = 95:4:1
d = KS:NaPsimd:NaPasp = 90:7:3
e = KS:NaPsimd = 99.97:0.03
KS= POTASSIUM SUCCINATE
MgS = MAGNESIUM SUCCINATE
NaPasp = SODIUM POLYASPARTATE
NaPsimd = POLYMALEIMIDE SODIUM SALT a = PS
b = PS:PG = 75:25
c = PS:PG = 50:50
d = PS:PG = 25:75
e = PG
PS= POTASSIUM SUCCINATE
PG = PROPYLENE GLYCOL

DEICING COMPOSITIONS AND METHODS OF USE

BACKGROUND OF THE INVENTION

The invention relates generally to a deicing composition and method of using the same and more particularly, to a deicing composition comprising succinate salts and methods of using succinate salt compositions for deicing applications at airport facilities and other applications involving specialty materials as well as for highway, residential and commercial deicing.

Chemical deicing is routinely used during the winter season to maintain safer mobility on United States highways and airports. There are numerous materials and compositions presently used for such deicing applications. However, there are many disadvantages to the presently used materials, including their corrosiveness, cost and their impact on the environment.

Common road salt is the most widely used deicing chemical on highways, driveways, sidewalks, etc. It is generally effective, inexpensive, reliable and easy to store and apply. As described in "Highway Deicing: Comparing Salt and Calcium Magnesium Acetate", Special Report 235, Transportation Research Board Committee on the Comparative Costs of Rock Salt and CMA for Highway Deicing, Washington, D.C., (1991), incorporated herein by reference, an estimated 10 million tons of road salt, at $35/ton, is used each year.

One of the major problems with road salt is that due to its corrosiveness. It has the potential to cause costly damage to highway infrastructure, driveway and sidewalk surfaces, motor vehicles and the environment. Structural damage may include concrete degradation and steel corrosion, which generally leads to high maintenance expenditure. Foliage burns, soil compaction and water contamination are some of the adverse environmental manifestations of sodium chloride use.

As described in, W. L. Miller, "Ways to Help Bridges and Deicers Coexist: CMA Cuts Corrosion on Zilwaukee Bridge", *Better Roads,* (February, 1993), and R. Strawn, "CMA has Role to Play in Critical Applications", T. Kuennen, Ed., *Roads & Bridges,* (March, 1993), each of which is hereby incorporated by reference, due to the problems associated with the corrosiveness of generally used salts as road deicing chemicals, a less harmful road deicing chemical, namely calcium magnesium acetate (CMA) was commercialized. Calcium magnesium acetate is known to inhibit concrete degradation and corrosion. It is also known to be less harmful to the environmental than conventional road salt. However, one of the downsides of CMA is its cost, which at $925/ton, is 20 times as much as common road salt. Further, CMA is a less than fully satisfactory deicer.

ICE BAN® is a recently developed deicer composition available from Ice Ban America, Inc. As described at the company's web site, http://www.iceban.com, ICE BAN® is a natural liquid concentrate residue from the wet milling of corn and the production of alcohol. It is generally non-corrosive and has good anti-icing and deicing properties. However, this product has not proved to be fully satisfactory. One downside of ICE BAN® is that it is formulated as a liquid deicer. Equipment currently used for spreading of conventional deicers are configured for solid deicers. Switching to a liquid deicer would require expensive equipment reconfigurations, leading to significant capital investment in addition to the capital required for liquid storage tanks. The viscosity of the liquid at low temperatures can pose additional problems.

Another currently available deicer is known as CF7, which is based on potassium acetate, manufactured by CRYOTECH, and which is believed to be scheduled for testing at airport applications. Airport and airbase deicers need to comply with stringent criteria and standards. It is believed that CF7 may pose corrosion problems in connection with certain airport applications and thus may not comply with standards for deicing aircraft metals.

EP Publication No. 0 077 767 discloses, inter alia, discloses a dicarboxylic acid mixture (hereinafter "DAM") consisting of adipic acid (30–35% wt), glutaric acid (40–50% wt) and succinic acid (20–25% wt) in the form of a potash salt which is asserted to be suitable for airport deicing. This formulation is in liquid form and is believed to possess deicing characteristics. However, it is believed that it does not comply with the corrosion standard for aircraft metals, and, in particular, does not comply with the corrosion standards for dichromate treated magnesium, which is the aircraft metal alloy that is most susceptible to corrosion.

The reference also discloses a combination of potassium salt of pure succinic acid, urea and water as an anti-freeze solvent (35.5 parts by weight:25 part:41.5 parts). The reference also states that the use of pure potassium succinate was less favorable as an antifreeze and corrosion inhibitor than the dicarboxylic acid mixtures disclosed therein, clearly discouraging use of potassium succinate in favor of a mix of certain carboxylic acids. Sixteen years have passed since this application was published and no commercial product based on the disclosure therein has gained any measure of market acceptance.

Thus, it is desirable to provide an improved deicing composition and method of using the same which is more commercially viable than those which have been suggested in the past.

SUMMARY OF THE INVENTION

Generally speaking, in accordance with the invention, improved deicing compositions and methods are provided. In particular, the subject invention is directed at deicing compositions which are suitable and effective for airport applications in which corrosion of magnesium based alloys is an issue. The present invention provides deicing compositions which can provide improved ice penetration characteristics and in particular, which can provide improved ice penetration characteristics compared to CMA, while maintaining relatively benign environmental effects. Further, the subject invention is directed at deicing compositions which can penetrate ice at temperatures below about −10° C.

The subject invention is also directed at deicing compositions which are less corrosive than conventional road salt. In particular, the invention is directed at deicing compositions which are less corrosive of steel and aluminum and certain magnesium based parts than conventional road salt. For example, the invention is directed to deicing compositions which are substantially less corrosive than allowed for use on aircraft metal parts, such as magnesium based alloys.

The subject invention is also directed at deicing compositions which inhibit the corrosive effects of conventional road salt. In particular, the invention is directed at deicing compositions which inhibit road salt corrosion of steel and aluminum and deicing compositions which inhibit corrosion of dichromate treated magnesium alloys and other aircraft metal alloys, as commonly used in airport/aircraft facilities or equipment.

The subject invention is also directed at deicing compositions comprising effective deicing amounts of succinate salts, such as potassium succinate (trihydrate), ammonium succinate (anyhdrous), sodium succinate (hexahydrate), either alone or in combination. The subject invention is also directed at deicing compositions comprising effective corrosion inhibiting, deicing amounts of potassium succinate together with effective amounts of either 1) polymaleimide sodium salt and magnesium succinate, 2) magnesium succinate and sodium polyaspartate, 3) polymaleimide sodium salt 4) sodium polyaspartate and polymaleimide sodium salt, 5) magnesium succinate or 6) sodium chloride which will enhance deicing and/or corrosion inhibiting properties. The subject invention is also directed at deicing compositions comprising sodium chloride together with an effective amount of succinate salts, such as potassium succinate for deicing with enhanced corrosion inhibiting properties.

In accordance with a preferred embodiment of the present invention, the subject invention is also directed at a deicing composition comprising an effective amount of ammonium succinate for enhanced deicing and corrosion inhibition.

The subject invention is also directed to compositions for inhibiting the corrosive effects of conventional road salt comprising a deicing and corrosion inhibiting effective amount of succinate salts, and in particular, either potassium succinate (trihydrate), ammonium succinate (anyhdrous) or sodium succinate (hexahydrate), either alone or in combination with each other.

The subject invention is also directed to compositions for inhibiting the corrosive effects of conventional road salt comprising combining sodium chloride with an effective amount of either potassium succinate, ammonium succinate, sodium succinate, sodium polyaspartate or polymaleimide sodium salt, either alone or in combination with each other to reduce the corrosive properties of a composition with sodium chloride.

In accordance with a preferred embodiment of the present invention, the subject invention is also directed at compositions for inhibiting the corrosive effects of conventional road salt comprising combining sodium chloride with an effective amount of sodium succinate and sodium polyaspartate to reduce the corrosiveness of the composition.

In accordance with a preferred embodiment of the present invention, the subject invention is also directed at methods of deicing surfaces, materials or articles, such as an airport runway or airport equipment comprising applying a composition comprising an effective deicing amount of potassium succinate and other optional activities to the surface, material or article.

In accordance with a preferred embodiment of the present invention, the subject invention is also directed at methods of deicing an aircraft comprising the step of applying a composition comprising an effective amount of potassium succinate to the aircraft, runway or other airport objects.

The invention accordingly comprises the several steps and the relation of one or more of such steps with respect to each of the others, and the compositions possessing the characteristics, properties and the relation of constituents useful to effect such steps, which will be exemplified in the compositions hereinafter described, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
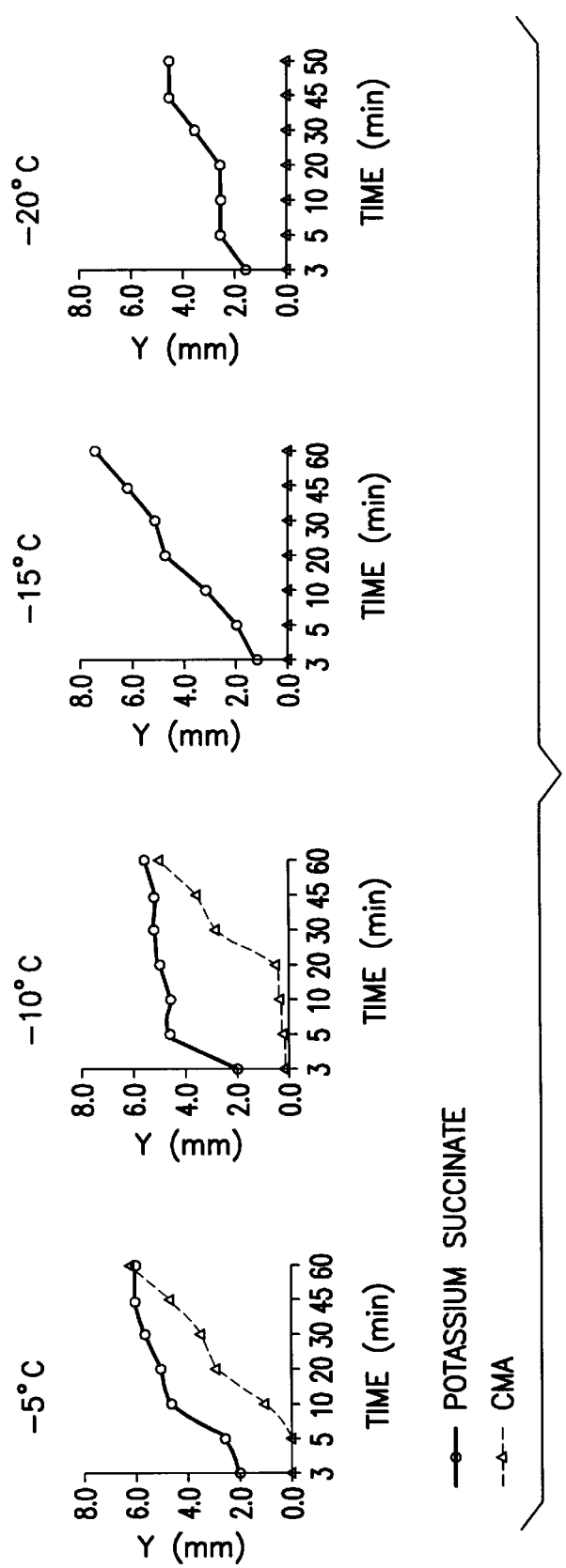
FIG. 1 is a graph depicting the ice penetration performance of potassium succinate and CMA at different temperatures.

The subject invention is directed at deicing compositions, including those comprising succinate salts and methods of use. Succinate salts are naturally occurring as well as being genetically manufacturable according to, for example, application Ser. No. 09/134,061 and U.S. Pat. No. 5,770,435, the contents of which are incorporated herein by reference. When used herein, the term succinate salts refers to either the naturally occurring salts, those synthetically produced or those produced via genetic engineering. However, methods involving genetically engineered salts can provide significant advantages, particularly in providing the salts at particularly advantageous prices.

Applicants determined that potassium succinate (e.g., potassium succinate trihydrate) repeatedly outperformed other succinate salts. It was found to be an effective deicer and non-corrosive. In comparison to CMA, the use of potassium succinate may result in up to a 40% direct savings. Additional indirect savings could be realized on account of the superior deicing capability of potassium succinate. Considering the financial burden incurred by State and County road authorities due to steel corrosion and concrete loss directly as a consequence of road salt use, potassium succinate should prove to be a cost effective, non-corrosive deicer for many of the expensive highway structures. In addition, it may be a viable option for application on environmentally sensitive areas where loss of vegetation and habitat is a concern. As a deicer that is superior in performance to CMA, potassium succinate will find a place in niche markets as has CMA.

Airport and airbase deicing is another extremely viable market for potassium succinate based deicers. Airport and airbase deicers need to comply with stringent criteria. These criteria are set to protect specialty alloys used in aircrafts in structurally critical areas. Applicants determined that potassium succinate can be formulated to meet and even far exceed the standard corrosivity requirements for aircraft metals. The potential for a potassium succinate based deicer for applications in airports and airbases is enormous. Although, material cost is always a driving factor in any application, the savings on service and repair expenditure that could be realized as a result of using a non-corrosive deicer is very likely to render the use of potassium succinate in such high-end applications economically feasible.

To establish that succinate salts are effective deicers, the ice penetrating capabilities of succinate salts were compared with other deicers. Also, due to the stringent criteria for airport deicers, the corrosiveness and corrosive inhibiting effects of succinate salts as compared with other deicers were established.

It was determined that many chloride blends containing succinate or succinate derived corrosion inhibitors displayed performance characteristics that were highly advantageous toward highway deicing. The tested inhibitors were capable of suppressing corrosion induced by the chloride salts as much as 50–75%. This corrosion suppression is advantageous because blends composed of high sodium chloride levels will assist in the development of an affordable product for road deicing applications. In addition, the presence of corrosion inhibitors in small quantities were not found to attenuate the ice-penetration and ice-melting capacities of chloride salts. The net result is a family of cost effective, high-performance deicers that are substantially less corrosive than straight chloride salts.

One notable determination was that potassium succinate based deicer formulae are ideally suited for airport and airbase deicing applications. Airport and airbase deicers need to comply with stringent corrosion criteria. These criteria are set to protect the specialty alloys used in aircrafts. It has been found that potassium succinate and other succinates in combination with carboxylate derived polymeric corrosion inhibitors exhibit tremendous success in formulating non-corrosive potassium succinate based deicers for application in airports and airbases. Neither CF7 nor DAM that have been formulated for airport deicing complied with standards for aircraft metal corrosion.

It was determined that potassium succinate repeatedly outperformed other succinate salts. It is an effective deicer and it is non-corrosive. The different tests and experiments conducted by applicants are described below.

Aspects of the invention will be discussed and exemplified with reference to the following examples which are presented for illustrative purposes only and are not intended to be construed in a limiting sense.

Method for the Determination of Ice-penetrating Capacity of Deicers

As described below, a slightly modified version of the SHRP H-205.3 protocol of the "Handbook of Test Methods for Evaluating Chemical Deicers", SHRP-H/WP-90, Strategic Highway Research Program, National Science Counsel, Washington, D.C., (1992)", incorporated herein by reference, was followed. The ice-penetration capacity was measured based on an observation of the penetration behavior of the deicer, which occurs chiefly by the propagation of a uniform melt front downward through the ice. The test involved the following steps:

1. Distilled water was placed in standard ice-penetration test cells and frozen.
2. Deicer samples of 25 mg or 100 mg were stored at room temperature.
3. The deicers were placed on the ice in the test cell at preset temperatures of −5° C., −10° C., −15° C. and −20° C.
4. At regular intervals of 10, 20, 30, 45 and 60 minutes, the ice-penetration depth was measured. The penetration depth was observed with the aid of a drop of dilute Bulls-Eye® dye placed on the ice surface. The dye gives a distinctive blue color at the ice-penetration front.
5. Tests were performed in triplicate.

Method for the Determination of Steel and Aluminum Corrosion Properties

The evaluation of corrosion inhibition properties, the SHRP H-205.7 protocol of the "Handbook of Methods for Evaluating Chemical Deicers", incorporated herein by reference, was followed. Corrosion properties of the numerous deicers were evaluated using 3% wt aqueous solutions. The test protocol involved the following steps;

1. Seven hundred and fifty milliliters of aqueous salt solutions was placed in stoppered Erlenmeyer flasks. The stopper was intended to prevent the rapid evaporation of water while permitting aeration for accelerated corrosion under controlled conditions. Metal coupons (SAE 1010 steel and ASTM D1730 aluminum), 1"×2", were suspended in the solutions with the aid of nylon string tied to a hole in the coupon.
2. The metal coupons were subjected to accelerated corrosion for two weeks while monitoring airflow, solution level, solution color and solution pH.
3. The corrosion rate, in mpy (1/1000 inches per year), was determined using the SHRP H-205.7 protocol for steel and aluminum.

Method for the Determination of Magnesium Corrosion Properties

For the evaluation of corrosion inhibition properties the ASTM F 483-91 protocol of the "Standard Test Method for Total Immersion Corrosion Test for Aircraft Maintenance Chemicals", incorporated herein by reference, was followed. Corrosion properties of the numerous deicers were evaluated using 3% wt aqueous solution. The test protocol involved the following steps;

1. 450 milliliters of aqueous salt solutions were placed in stoppered Erlenmeyer flasks. The stopper was intended to prevent the rapid evaporation of water. The solutions were kept at 38° C. during 24 hours of experimentation. Metal coupons (Dichromate treated as in AMS 2475 Wrought Magnesium alloy designated as ASTM AZ31B to AMS 4376.), 1"×2", were suspended in the solutions with the aid of nylon string tied to a hole in the coupons.
2. The metal coupons were subjected to corrosion for 24 hours while monitoring solution level, temperature, color and pH.

3. The corrosion rate, expressed in $mg/cm^2$, was determined using ASTM F 483-91 protocol.

Method for the Determination Freezing Points

The following protocol was followed to determine the freezing points of deicers. Deicer concentration in aqueous media was 50% wt.

1. Eight milliliters of aqueous deicer solutions were placed in sealed, plastic tubes.
2. The tubes were immersed overnight in a Polystat Chiller containing silicone heat transfer fluid maintained at predetermined temperatures. The temperature range was 0 to –45° C.
3. After the overnight immersion period, the deicer samples were visually examined to identify the frozen ones and recorded.
4. The temperature was further lowered and the samples remaining in a liquid state were kept immersed overnight.
5. Steps 3 and 4 were repeated until all samples in an experiment were frozen.

EXAMPLE 1

First, the performance of substantially pure solid potassium succinate was compared to that of CMA to demonstrate the overall superiority of potassium succinate as a non-corrosive deicer with respect to ice-penetration capacity and corrosion characteristics.

The ice-penetration performance of potassium succinate and CMA are presented in FIG. 1. The protocol described earlier (Method For The Determination Of Ice-Penetrating Capacity Of Deicers) was used with 25 mg of solid deicer. The rate of ice-penetration of CMA at –5° C. and –10° C. is significantly lower than that of potassium succinate. Calcium magnesium acetate was totally ineffective below –10° C. Clearly, potassium succinate was shown to be a superior deicer compared to CMA at temperatures down to –20° C. and does not freeze until its temperature drops below –40° C.

EXAMPLE 2

The steel corrosion rates in 3% wt aqueous solutions of potassium succinate, CMA and sodium chloride were evaluated. The results indicate that both potassium succinate and CMA do not promote significant steel corrosion. The rate of steel corrosion in potassium succinate and CMA was 0.01 mpy and 0.04 mpy, respectively. These negligible values would fall into experimental error limits. This is confirmed by the observation that no corrosion appeared on metal samples in repeated experiments. Conversely, the steel corrosion rate in sodium chloride was 18 mpy and corrosion was visible.

EXAMPLE 3

Figure 2:
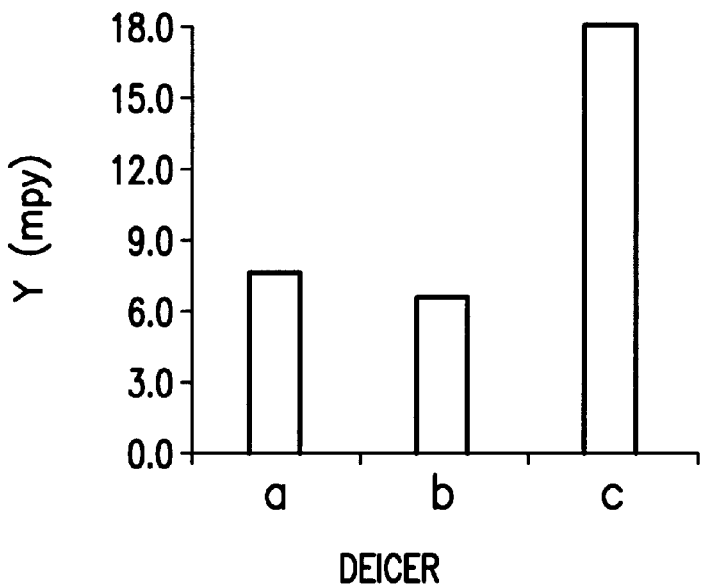
FIG. 2 is a graph depicting the rate of steel corrosion in aqueous deicer solutions containing 3% wt deicer.

The inhibition of steel corrosion by potassium succinate and CMA in aqueous sodium chloride solutions were evaluated. The added potassium succinate and CMA was 2% wt of the total amount of salt while the total amount of salt was 3% wt of the aqueous solution. The results of this experiment are presented in FIG. 2. As shown, small amounts of either potassium succinate or CMA have a significant impact on the corrosiveness of sodium chloride. Both potassium succinate and CMA inhibited more than 50% of the corrosion induced by sodium chloride.

Examples 1–3 were designed to compare the performance characteristics of potassium succinate with that of CMA which is the most recognized commercially available alternative highway deicer. The comparison criteria included ice-penetration capacity, corrosion and corrosion inhibition properties. The rate of ice-penetration by CMA was shown to be significantly slower than that by potassium succinate. CMA did not penetrate ice below –10° C., whereas potassium succinate penetrated ice at temperatures as low as –20° C. and can exhibit deicing characteristics at still lower temperatures.

Potassium succinate and CMA were shown to be non-corrosive and to inhibit the corrosive tendencies of sodium chloride in excess of 50%. Both are biodegradable and should not have any cumulative effects on the environment. The Federal Highway Administration ("FHWA") identifies CMA as the "only environmental alternative to salt" at the present time. However, it has been determined that the deicing capability of potassium succinate is superior to that of CMA while possessing essentially the same environmental benefits and protection from corrosion that CMA provides. This is in addition to a 40% savings on a direct cost basis. More savings can be realized due to the superior deicing capability of potassium succinate. Savings will materialize as a result of reduced application loads and frequencies. This suggests that potassium succinate is a more viable alternative deicer for application on expensive road structures and environmentally sensitive areas.

EXAMPLE 4

The performance of potassium succinate was compared to that of other succinate salts. The succinate salts included sodium, ammonium, calcium and magnesium succinate.

The SHRP H-205.3 protocol of the "Handbook of Methods for Evaluating Chemical Deicers" for evaluating ice-penetration capacity of deicing chemicals suggests the use of 25 mg of deicer in a test cell. However, 100 mg of deicer was used based on the respective anhydrous species to accentuate the subtleties, if any, in the performance of the salts tested. Therefore, the absolute ice-penetration depths of potassium succinate presented in FIG. 1 differs from that presented in this Example.

Figure 3:
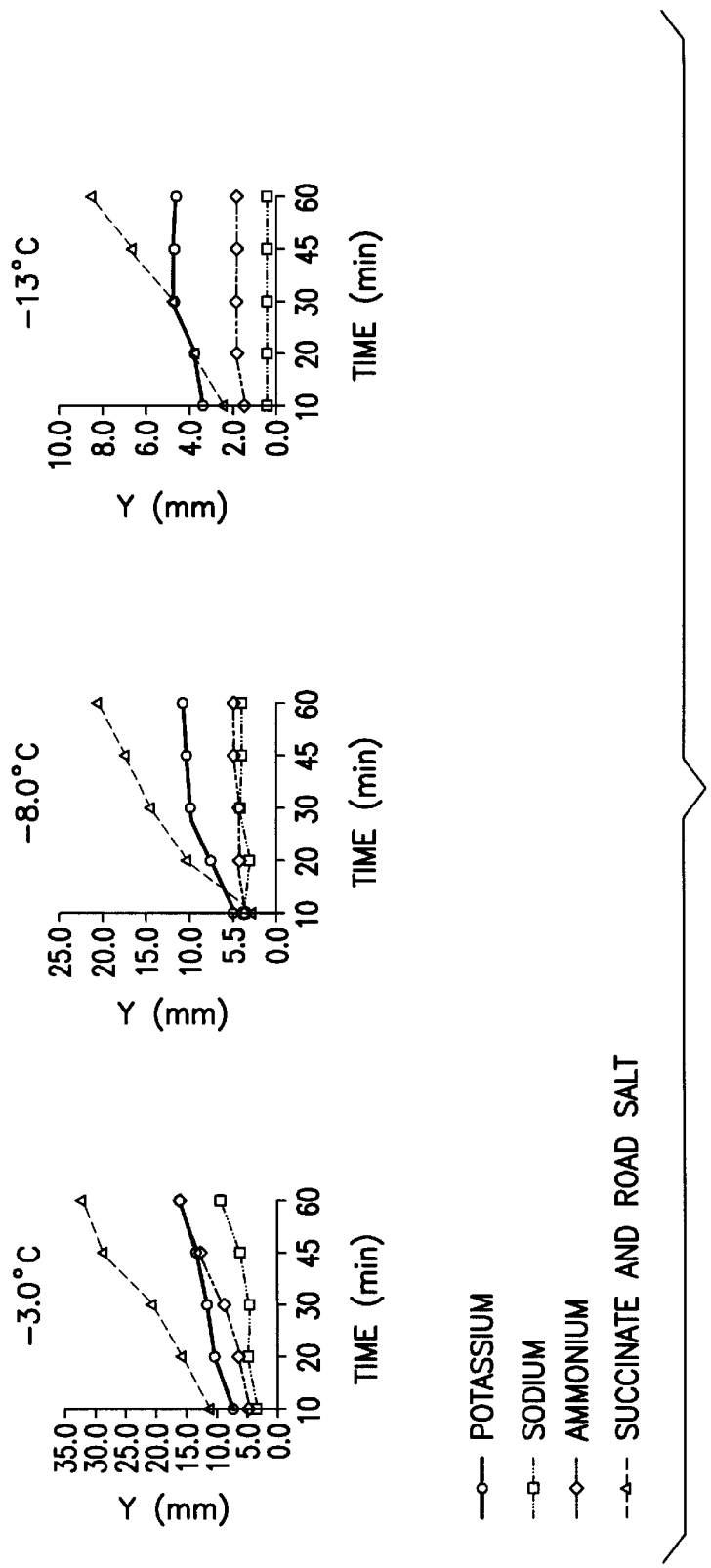
FIG. 3 is a graph depicting the ice penetration performance of succinate salts in comparison to road salt at different temperatures.

As shown in FIG. 3, potassium succinate (trihydrate) repeatedly outperformed all the other salts followed, by ammonium succinate (anhydrous) and sodium succinate (hexahydrate) over the temperature range studied. Ice-penetration of succinate salts was also compared to that of road salt. The final depth reached by potassium succinate (trihydrate) was about half of that reached by road salt. Sodium succinate (anhydrous), calcium succinate (monohydrate) and magnesium succinate (anhydrous) were also tested. Sodium succinate (anhydrous) had minimal ice-penetration capacity at –3° C. and hardly any at lower temperatures. Calcium succinate had no deicing capability. The deicing capability of magnesium succinate was negligible.

EXAMPLE 5

Figure 4:
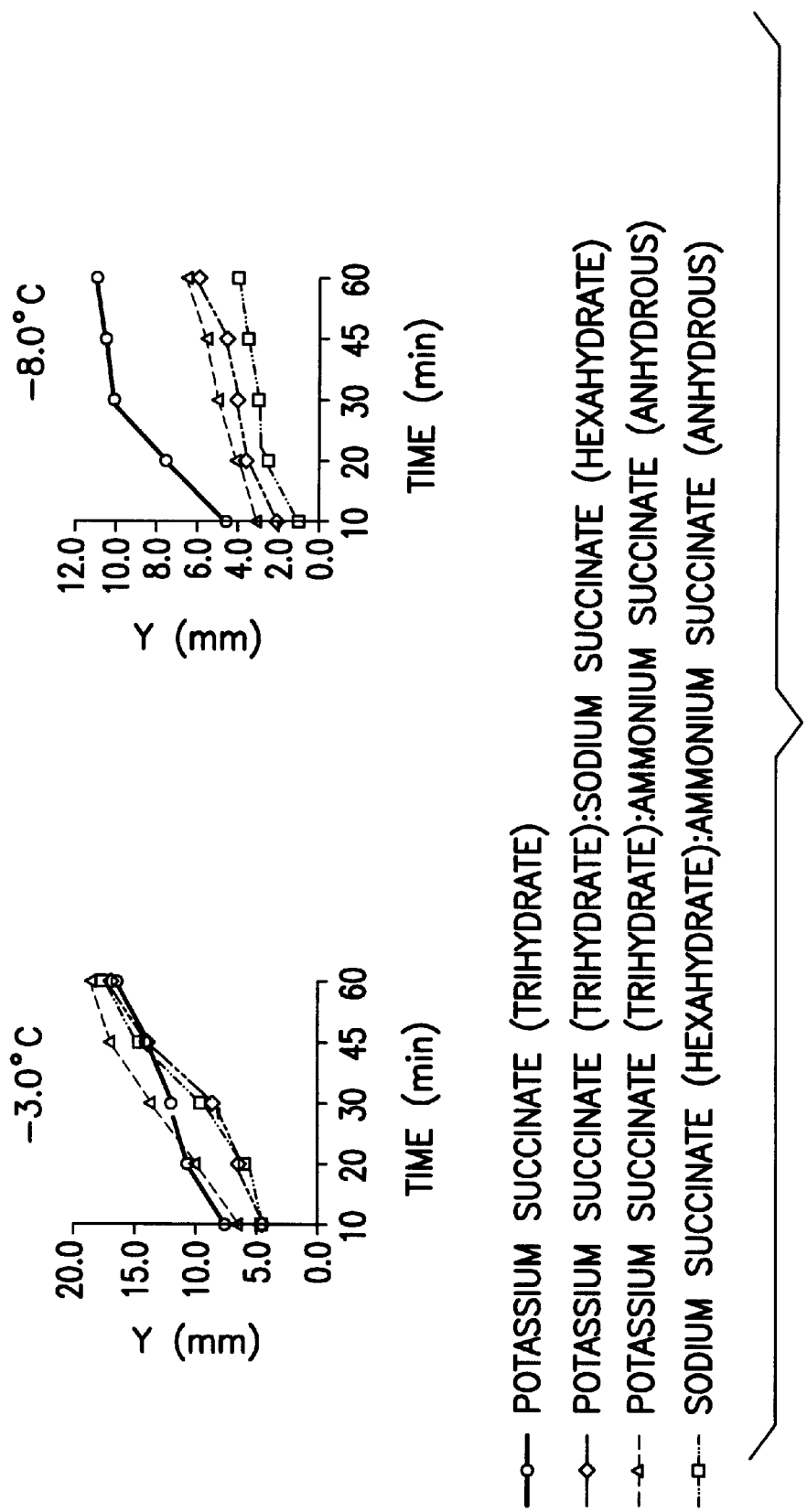
FIG. 4 is a graph depicting the ice penetration performance of 50:50 succinate mixtures compared to potassium succinate.

The synergistic effects of these salts were also confirmed. Ice-penetration tests were carried out using 50:50 mixtures of potassium succinate (trihydrate), ammonium succinate (anhydrous) and sodium succinate (hexahydrate). The components were measured on an anhydrous basis. The results are presented in FIG. 4. At –3° C., the performance of all the mixtures was comparable to that of essentially pure potassium succinate (trihydrate). However, at lower temperatures, the ice-penetration capacities of the mixtures diminished dramatically in comparison to that of essentially pure potassium succinate (trihydrate). Overall, there was no evidence of synergistic behavior. In fact, mixing seemed to attenuate the deicing power of both potassium and ammonium succinate.

The data obtained suggest that potassium succinate possesses the best ice-penetration capacity. In high-end applications, such as airport/airbase deicing, where high costs on services and repairs attributed to the use of inferior deicers override the need for very cheap deicers, potassium succinate has been shown to be a viable alternative. Potassium succinate based deicing formulae that comply with the stringent standards for airport/airbase deicers are presented and discussed in Examples 10 and 13.

EXAMPLE 6

The steel corrosion rate in 3% wt aqueous solutions of potassium succinate, sodium succinate, ammonium succinate and sodium chloride was studied. The results presented in FIG. 5 indicate that the succinate salts, with the exception of ammonium succinate, do not promote steel corrosion. The rate of steel corrosion in potassium succinate and sodium succinate was 0.01 mpy and 0.03 mpy, respectively. Therefore, the values are not visible on the chart. It is believed that these negligible values would fall into experimental error limits. This is confirmed by the observation that no corrosion appeared on metal samples in repeated experiments. The steel corrosion rate in sodium chloride was 18.

Figure 5:
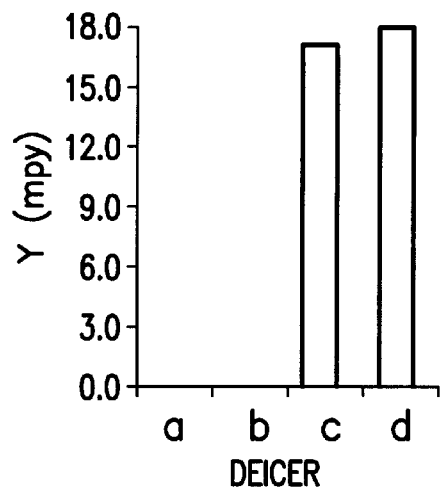
FIG. 5 is a graph depicting the rate of steel corrosion in aqueous deicer solutions containing 3% wt deicer.

The SHRP H-205.7 protocol of the "Handbook of Methods for Evaluating Chemical Deicers" that was used to evaluate corrosion properties of the salts, calls for the suspension of two steel coupons in aqueous deicer solutions. The electrochemical properties of ammonium succinate facilitate extensive corrosion of one of the coupons and protect the other from any corrosion. Ammonium succinate displayed this behavior in repeated experiments. The method used by the protocol to report the data is the average rate of corrosion of the two suspended coupons. For ammonium succinate, the average, as given in FIG. 5, is 17.13 mpy. This average corrosion rate is reflective of one steel coupon that corroded as much as 34.26 mpy and one that corroded 0.0 mpy.

Figure 6:
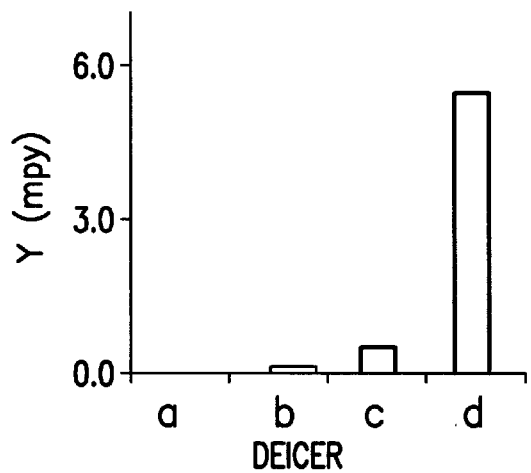
FIG. 6 is a graph depicting the rate of aluminum corrosion in aqueous deicer solutions containing 3% wt deicer.

The aluminum corrosion rate in 3% wt aqueous solutions of potassium succinate, sodium succinate, ammonium succinate and sodium chloride was studied and the results are presented in FIG. 6. The results indicate that both potassium succinate and sodium succinate do not promote aluminum corrosion. The rate of aluminum corrosion in potassium succinate and sodium succinate was 0.00 mpy and 0.05 mpy, respectively. These negligible values, are believed to fall into experimental error limits. This is confirmed by the observation that no corrosion appeared on metal samples in repeated experiments. Conversely, the aluminum corrosion rate in sodium chloride was 5.4 mpy. The rate of aluminum corrosion in ammonium succinate solutions was 0.5 mpy. Although aluminum corrosion rate in ammonium succinate solutions is higher than that in potassium and sodium succinate solutions, it is substantially lower than that in sodium chloride solutions.

EXAMPLE 7

Figure 7:
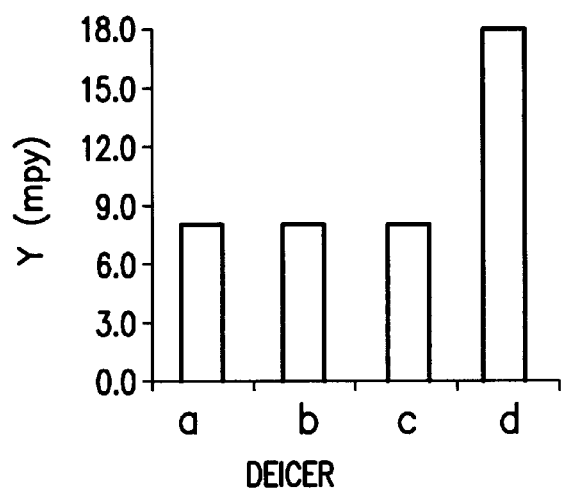
FIG. 7 is a graph depicting the rate of steel corrosion in aqueous solutions containing 3% wt deicer.

The inhibition of steel corrosion by potassium succinate, sodium succinate and ammonium succinate in aqueous sodium chloride solutions was studied. The amount of succinate in the chloride blends was 2% by weight (% wt) of deicer. The aggregate amount of deicer was 3% wt of the aqueous solution. Results of these experiments are presented in FIG. 7

All three succinates displayed inhibition of chloride induced corrosion in excess of 50%. Thus, formulations inhibiting corrosion by at least 20% or higher (or lower, for that matter) are also possible. This data suggests that the succinates possess corrosion inhibition capabilities in addition to being non-corrosive.

EXAMPLE 8

The impact of alternative corrosion inhibitors that can be derived economically from carboxylic acids, such as succinic acid and maleic acid with potential for use in combination with succinate deicers was investigated. Two polycarboxylates, a sodium polyaspartate sold by Bayer and a polymaleimide sodium salt have been experimented with. In this regard, applicants were primarily interested in studying possible synergistic enhancements of corrosion inhibition by combinations of succinates and polycarboxylates.

Figure 8:
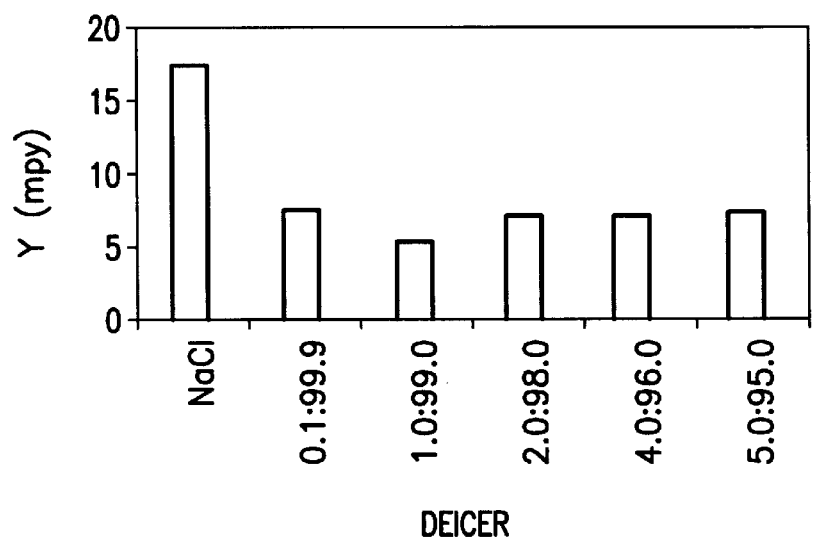
FIG. 8 is a graph depicting the rate of steel corrosion in aqueous solutions containing 3% wt deicer (sodium polyaspartate:sodium chloride)

Applicants investigated the effect of sodium polyaspartate on steel corrosion induced by sodium chloride. The results are presented in FIG. 8. All the compositions studied display inhibition of corrosion in excess of 50%. Thus, formulations inhibiting corrosion less than 50%, such as at least 20% can also be formulated. One observed feature was that it is equally effective at very low levels (sodium polyaspartate: sodium chloride=0.1:99.9). Effectiveness at low levels is a promising prospect since it will aid in reducing the cost of the deicer to be competitive in low-end applications such as highway deicing.

EXAMPLE 9

Figure 9:
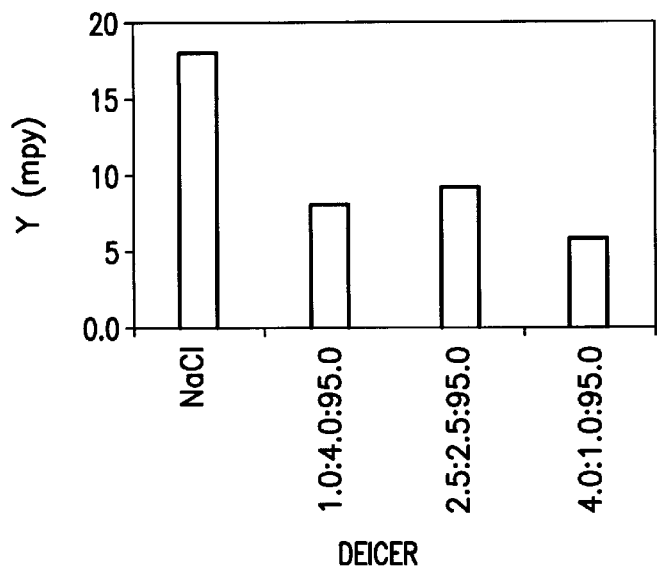
FIG. 9 is a graph depicting the rate of steel corrosion in aqueous solutions containing 3% wt deicer (sodium succinate:sodium polyaspartate:sodium chloride)

Possible synergistic enhancement of corrosion inhibition by mixtures of succinates and polyaspartate was investigated. Results of experiments carried out with sodium succinate and sodium polyaspartate are given in FIG. 9. The results suggest that the 4.0:1.0:95.0 ratio of sodium succinate/sodium polyaspartate/sodium chloride contributed to an enhancement in corrosion inhibition. The amount of corrosion allowed by this composition is less than allowed by any of the succinate and chloride blends.

Figure 10:
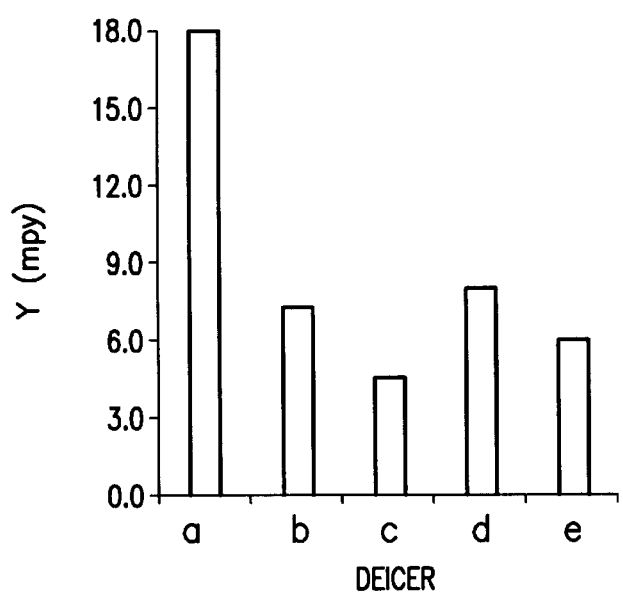
FIG. 10 is a graph depicting the rate of steel corrosion in aqueous deicer solutions containing 3% wt deicer.

Experiments were conducted to confirm the effect of the polymaleimide sodium salt on steel corrosion induced by sodium chloride. The results are presented in FIG. 10. The data indicate that the polymaleimide sodium salt is capable of inhibiting 75% of the corrosion induced by sodium chloride. With regard to aqueous sodium chloride solutions, this is the most inhibition realized in the experiments with high sodium chloride content. The data also indicate that the amount of inhibition provided by the polymaleimide sodium salt are dependent on its chemical makeup.

It is believed that 75% less corrosive sodium chloride and calcium chloride based deicers will find a place in many deicing applications regardless of the slight increase in cost resulting from the inclusion of a small amount of inhibitor. The accrued savings due to the anticipated reduction in repair and service costs associated with corrosion is believed to easily override the additional up-front costs leading to net savings.

EXAMPLE 10

The data established that potassium succinate is ideally suited for deicing airports and airbases. Airport and airbase deicers have to comply to stringent safety standards designed to protect specialty alloys that are used in critical areas of aircraft.

A series of AMS standard tests was conducted to study the effects of deicers on aircraft metals. Among them is the Total Immersion Corrosion Test, incorporated herein by reference, where numerous test panels are suspended in aqueous solutions of proposed deicers for 24 hours. Test results indicate that potassium succinate conformed well within the allowable standards for the following aircraft alloys: anodized AMS 4037 Al alloy, AMS 4041 Al alloy, AMS 4049 Al alloy, AMS 4911 Ti alloy and AMS 5045 carbon steel.

EXAMPLE 11

Figure 11:
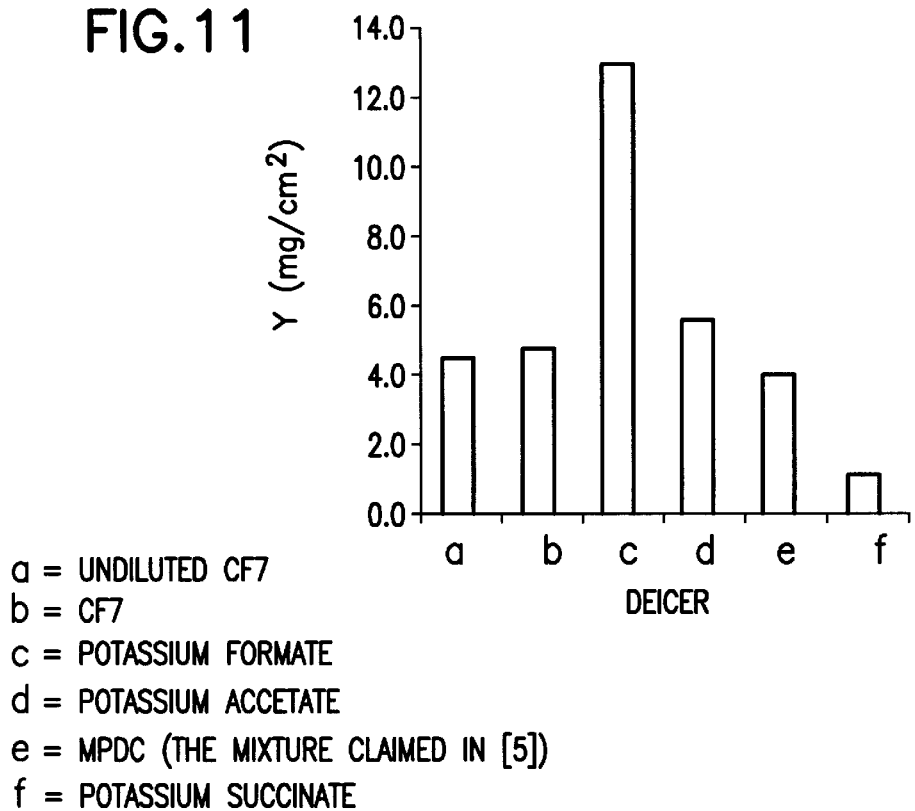
FIG. 11 is a graph depicting the rate of dichromate treated magnesium alloy corrosion in aqueous deicer solutions containing 3% wt deicer, except in the case of "a" where CF7 was used as received.

The corrosion inhibitive effects of potassium succinate on dichromate treated AMS 4376 Mg alloy were compared to that of pure CF7 manufactured by CRYOTECH of Iowa, potassium acetate (the main constituent of CF7), the DAM claimed in EP Publication No. 0 077 767 in the form of a potash salt and potassium formate. The comparison is given in FIG. 11. Corrosion of the magnesium alloy was tested in 3% wt aqueous deicer solutions for 24 hr, unless otherwise noted. Potassium succinate was found to be 75% less corrosive than CF7 and 80% less corrosive than potassium acetate, which is the main constituent of CF7. Potassium formate is 13 times more corrosive than potassium succinate. Further, potassium succinate is 75% less corrosive than the carboxylate mixture claimed in EP Publication No. 0 077 767.

EXAMPLE 12

In an effort to formulate a potassium succinate based deicer that exhibited sufficiently low corrosion to conform to corrosivity standards for dichromate treated magnesium alloy, the corrosiveness of several compositions that include succinate derived polycarboxylate salt corrosion inhibiting additives, such as sodium polyaspartate and polymaleimide sodium salt were investigated.

Figure 12:
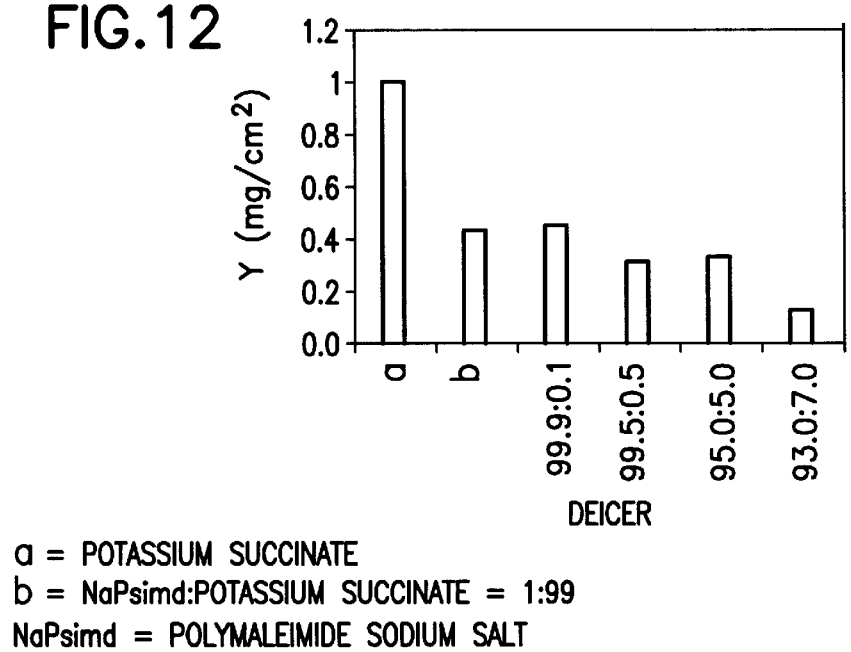
FIG. 12 is a graph depicting the rate of dichromate treated magnesium alloy corrosion in aqueous solutions containing 3% wt deicer (potassium succinate:sodium polyaspartate)

Mixtures of potassium succinate with sodium polyaspartate and polymaleimide sodium salt displayed significant improvements in corrosion inhibition compared to straight potassium succinate. The results are given in FIG. 12. While mixtures of potassium succinate and sodium polycarboxylates can be at least 50% more effective than straight potassium succinate, the potassium succinate:sodium polyaspartate, 93:7, mixture is 85% more effective. Moreover, the 93:7 mixture of potassium succinate:sodium polyaspartate conforms to the aircraft metal standard for dichromate treated AMS 4376 magnesium alloy. In fact, the corrosiveness of this mixture is approximately 40% less than that allowed by the aircraft metal standard.

Ratios of potassium succinate to succinate derived polycarboxylate salt corrosion inhibiting additives of between 90:10 and 99:1 are preferred.

EXHIBIT 13

Figure 13:
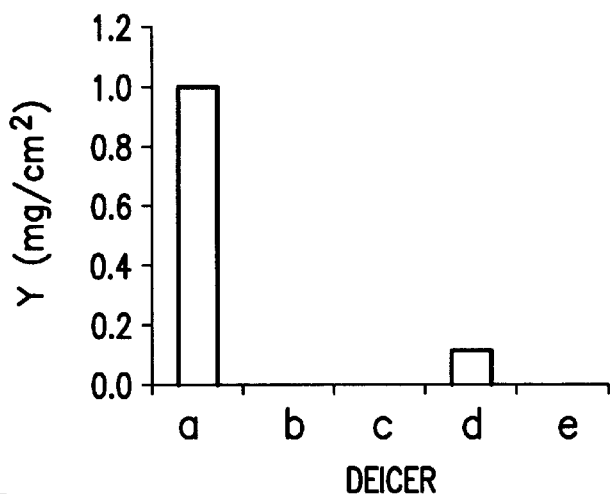
FIG. 13 is a graph depicting the rate of dichromate treated magnesium alloy corrosion in aqueous solutions containing 3% wt deicer.

Although accomplishing full conformation on the Total Immersion Corrosion Test with the 93:7 composition of Example 12 has advantages, it was deemed further advantageous to find additional formulae containing succinate derived polycarboxylate salt corrosion inhibiting additives that exhibited superior corrosion inhibitive properties. Results of some of the successful mixtures are given in FIG. 13. Both mixtures, potassium succinate:magnesium succinate (95:5) and potassium succinate: magnesium succinate: sodium polyaspartate (95:4:1), were found to be non-corrosive toward the dichromate treated magnesium alloy. Clearly, the potential for a potassium succinate based deicer for application in airports and airbases is enormous. Although, material cost is always a significant factor in any application, the savings on service and repair expenditure that can be realized as a result of using a non-corrosive deicer is very likely to render the use of a potassium succinate based deicer in such high-end applications economically feasible.

EXAMPLE 14

Figure 14:
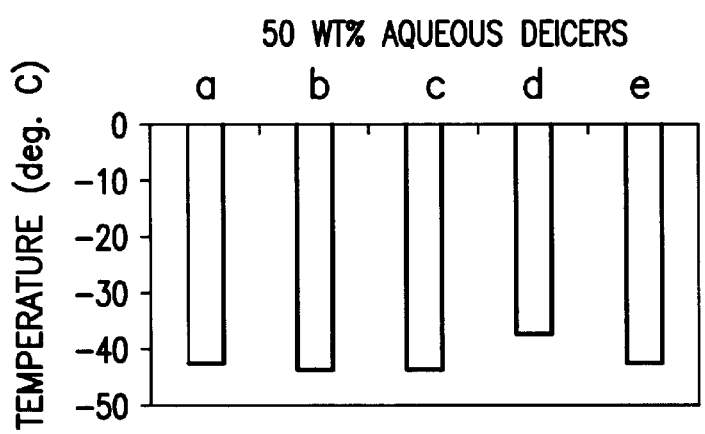
FIG. 14 is a graph depicting the freezing point depression of 50% wt aqueous deicer solutions.

Currently, airplane deicers/anti-icers are liquid formulations based on heavy alcohols such as propylene glycol. Propylene glycol has good anti-icing properties and low freezing points in aqueous solutions. A comparison between experimental freezing points of aqueous propylene glycol and aqueous potassium succinate is provided in FIG. 14. The freezing points of potassium succinate and propylene glycol are comparable. EPO 0 077 767 discloses that the DAM claimed therein has a "pour point and re-liquification point of below −20° C." Clearly, potassium succinate is superior to the DAM on account of its significantly lower freezing point of below −40° C. and superior corrosion inhibition properties.

Many of the chloride blends consisting of succinate or succinate derived corrosion inhibitors displayed performance characteristics that exhibited advantageous properties for use in highway deicing. The tested inhibitors were capable of suppressing corrosion induced by the chloride salts as much as 50–75%. This is advantageous because blends composed of high sodium chloride levels will help in the development of an affordable product for road deicing applications. In addition, it is unlikely that the presence of corrosion inhibitors in small quantities will attenuate the ice-penetration and ice-melting capacities of chloride salts. The anticipated net result will be a family of cost effective, high-performance deicers that are substantially less corrosive than straight chloride salts.

EXAMPLE 15

Deicing chemicals corrode concrete in different ways. Concrete as it is used in infrastructure may face rebar corrosion in reinforced concrete due to macrocell corrosion, scaling and spalling or potholing due to concrete surface corrosion. This in turn causes continuous infrastructure deterioration. Considering just the damage to bridges in the USA, the U.S. Dept. of Transportation has estimated in 1991 that $90.9 billion will be needed to repair the damage already incurred to 226,6000 bridges. The enormity of this type of expense necessitates continuous effort to reduce concrete corrosion. The following experiment evaluates the scaling effect of different salt solutions on concrete specimens.

To measure the scaling effect of different deicing chemicals on concrete surfaces, the SHRP H-205.9 test protocol entitled "The Method for Evaluation of Scaling Effects of Deicing Chemicals on Concrete Surfaces" from the Handbook of Test Methods for Evaluating Chemical Deicers, Strategic Highway Research Program, National Research Council, Report number SHRP-H/WP-90, along with applicable ASTM standards were followed. Concrete specimens (6×12×3 inches), two for each salt sample, were prepared in specially made molds for each sample. Concrete was supplied by a local concrete mixer. After two stages of 24 hrs (23° C.±1.7° C. and 45 to 55% relative humidity) and 28 days (14 days at 100% relative humidity according to ASTM C 511-85 and 14 days at 23° C.±1.7° C. and 45 to 55% relative humidity) curing process, the specimens underwent 5, 10, 15, 20, 25, 30, 35, 40, 45 and 50 cycles of freezing/thawing at a controlled temperature of −17.8° C.±2.3° C. and a relative humidity of about 35%, with thawing at room temperature. At the end of each five cycles, the salt solutions along with scaled concrete were collected from the reservoir or the pond of the specimens. The solutions were vacuum filtered and the residual solids were dried over night and weighed to determine the quantity of scaled material. Also, at the end of each five cycles, after removing the scaled material from the specimen, a visual rating of the concrete surface was given for each specimen according to the guidelines in ASTM C 672-84.

Figure 15:
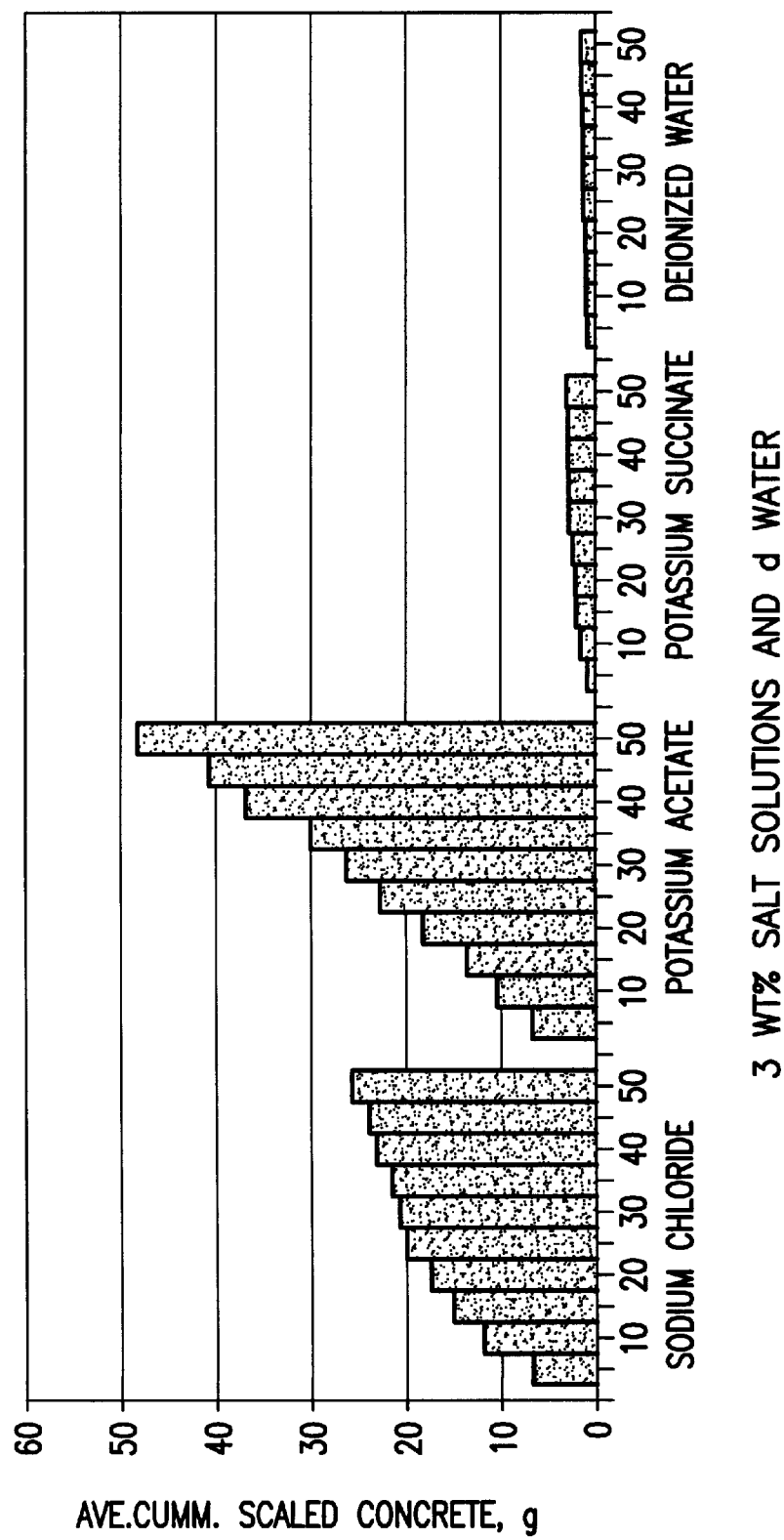
FIG. 15 is a graph depicting scaling of concrete specimens in different solutions and water after 5 to 50 freezing/thawing cycles.

The experimental results are presented in Table I and FIG. 15. This study shows that potassium acetate is more corrosive than sodium chloride on the concrete surface, while there is a minimal scaling for potassium succinate. In addition, visual inspection of the affected surface of the concrete specimens indicates a no scaling grade for water and potassium succinate as compared to 3 to 5 for sodium chloride and potassium acetate which is moderate to severe scaling (coarse aggregate visible over some to entire concrete surface). Accordingly, potassium succinate makes an excellent deicer for concrete.

One notable accomplishment of the subject application was the discovery of potassium succinate based deicer formulae that are ideally suited for airport and airbase deicing. Airport and airbase deicers need to comply with stringent criteria. These criteria are set to protect the specialty alloys used in aircrafts. Applicants conducted numerous experiments using potassium succinate and other corrosion inhibitors to achieve conformation. Applicants had tremendous success in formulating non-corrosive potassium succinate based deicers for application in airports and airbases. Neither CF7 nor DAM that have been formulated for airport deicing complied with standards for aircraft metal corrosion.

It will thus be seen that the objects set forth above, among those made apparent from the preceding description, are efficiently attained and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of deicing airport runways or airplane surfaces, comprising applying to an ice covered airport runway or airplane surface, an ice reducing amount of a deicing composition comprising potassium succinate and sodium polyaspartate to substantially reduce the ice on the runway or airplane surface.

2. The method of claim 1, comprising the step of spreading a solid composition comprising potassium succinate and sodium polyaspartate onto an airport runway surface.

3. The method of claim 1, comprising the step of deicing an airport runway with a liquid composition comprising potassium succinate and sodium polyaspartate.

4. The method of claim 1, comprising the step of deicing an airplane with a liquid composition comprising potassium succinate and sodium polyaspartate.

5. A method of reducing ice on an ice covered surface of an object comprising a magnesium based alloy material, comprising applying to the ice on such surface, an ice reducing amount of a liquid deicing composition comprising a succinate salt and sodium polyaspartate to substantially reduce the ice on the surface.

6. The method of claim 5, wherein the succinate salt comprises potassium succinate.

7. The method of claim 6, wherein the composition comprises potassium succinate and sodium polyaspartate in a ratio between 90:10 and 99:1.

8. The method of claim 5, wherein the composition comprises potassium succinate and sodium polyaspartate in a ratio of about 97:3.

9. The method of claim 5, wherein the composition further comprises magnesium succinate.

10. A method of removing ice from surfaces, comprising applying to said ice, an ice removing amount of a deicing composition comprising chloride salts and an effective amount of a succinate salt to reduce by at least about 20%, the corrosive properties of the same composition, without the succinate salt, measured by the corrosiveness to steel of a 3% aqueous solution of the composition.

11. The method of claim 10, wherein the succinate salt component comprises potassium succinate.

12. The method of claim 11, wherein the succinate salt reduces the corrosiveness of the deicing composition by at least 50%.

13. A deicing composition, comprising a sodium or calcium chloride salt and about 1 to 10% succinate salt.

14. The composition of claim 13, wherein the composition comprises 1 to 10% potassium succinate.

15. The deicing composition of claim 13, wherein the composition comprises 1 to 10% potassium succinate.

16. A deicing composition comprising a succinic acid salt and sodium polyaspartate.

17. The deicing composition of claim 16, further comprising a polymaleimide salt.

18. The deicing composition of claim 16, wherein the ratio of succinic acid salt to sodium polyaspartate is about 90:10 to 99:1.

19. The deicing composition of claim 16, comprising potassium succinate and sodium polyaspartate in a ratio of about 97:3.

20. The deicing composition of claim 16, comprising potassium succinate and magnesium succinate in a ratio of about 95:5.

21. The deicing composition of claim 16, comprising potassium succinate, magnesium succinate and sodium polyaspartate in a ratio of about 95:4:1.

* * * * *